United States Patent (10) Patent No.: US 7,592,028 B2
Vodovotz et al. (45) Date of Patent: Sep. 22, 2009

(54) COMPOSITIONS AND PROCESSES FOR MAKING HIGH SOY PROTEIN-CONTAINING BAKERY PRODUCTS

(75) Inventors: Yael Vodovotz, Hilliard, OH (US); Cory Ballard, Columbus, OH (US)

(73) Assignee: The Ohio State University, Colmbus, OH (US)

( * ) Notice: Subject to any disclaimer, the term of this patent is extended or adjusted under 35 U.S.C. 154(b) by 596 days.

(21) Appl. No.: 11/210,303

(22) Filed: Aug. 24, 2005

(65) Prior Publication Data

US 2005/0281931 A1 Dec. 22, 2005

Related U.S. Application Data

(62) Division of application No. 10/267,845, filed on Oct. 9, 2002, now abandoned.

(51) Int. Cl.
*A21D 8/00* (2006.01)
(52) U.S. Cl. ............... 426/496; 426/549; 426/618; 426/634; 426/653; 426/656
(58) Field of Classification Search ............... None
See application file for complete search history.

(56) References Cited

U.S. PATENT DOCUMENTS

| 4,550,023 A | 10/1985 | Schoberth |
| 4,643,900 A * | 2/1987 | Porter .................. 426/21 |
| 5,110,614 A * | 5/1992 | Corbin et al. ............ 426/555 |
| 5,320,859 A | 6/1994 | Namdari |
| 5,403,610 A * | 4/1995 | Murphy et al. ........... 426/549 |
| 5,874,538 A | 2/1999 | Kuwata et al. |
| 6,221,418 B1 | 4/2001 | Bergenfield et al. |
| 6,291,009 B1 | 9/2001 | Cohen |
| 6,355,283 B1 | 3/2002 | Yamada et al. |
| 6,479,089 B2 | 11/2002 | Cohen |
| 6,733,815 B2 | 5/2004 | Gilbertson et al. |
| 2003/0068329 A1 | 4/2003 | Kosuna et al. |
| 2004/0071852 A1 | 4/2004 | Vodovotz et al. |

FOREIGN PATENT DOCUMENTS

WO  WO 02/051250     7/2002
WO  WO2004/032634 A2  4/2004

OTHER PUBLICATIONS

"Bread Recipes", *Soy Products (Sales) PTY Ltd.*, 10 pages.

"French Meadow Bakery Woman's Bread with Soy Isoflavones" Sell Sheet, 12 pages.
"No-Hassle Soy Bread", 1 page.
"Oatmeal Bread", *Soy Foods Cookbook* (Copyright 1998), 1 page.
"Simply Soy Bread Recipe", 1 page.
"Soy Vey" (Challah Bread Recipe), *Recipe Source*, 2 pages.
Ohio State University Medical Center, "Ohio State Scientists bake heart healthy soy bread", Public Release Date Dec. 6, 2001, 1 page.
Rappole et al., "Design of a Food Service and Food Processing System for Long Duration Missions in a Closed Environment", ISSO Y1999-2000, UHCL/UH, pp. 46-50.
Setchell, "Overview of Isoflavone Structure, Metabolism and Pharmcokinetics", *Second International Symposium on the Role of Soy in Preventing and Treating Chronic Disease* (Sep. 15-18, 1996), 2 pages.
Coward et al., "Chemical modification of isoflavones in soy foods during cooking and processing" Am. J. Clin. Nutr. (1998) vol. 68 (Suppl.), pp. 1486S-1491S.
Zhang et al., "Changes is distribution of isoflavones and β-glucosidase activity during soy bread proofing and baking" Cereal Chemistry (2004) 81(6):741-745.
Zhang et al., "Changes in water state and distribution of isoflavones in soy bread", The Ohio State University, Food Science & Technology Department (2003) Poster.
Zhang et al., "Isoflavone content and anti-cancer activity of soy bread and its components", 2002 IFT Annual Meeting and Food Expo, Anaheim, CA (Jul. 2002). Abstract.
Zhang et al., "Effects of soy addition on the state of water and isoflavone content in bread", The Ohio State University, Food Science & Technology Department (2003) Poster.
Zhang et al., "Isoflavone composition and biological activity of extracts from soy bread and crust", The Ohio State University, Food Science & Technology Department (2003) Poster.
Zhang et al., "Isoflavone Content and Anti-Cancer Activity of Soy Bread and Its Components", The Ohio State University, Food Science & Technology Department, (Jun. 18, 2002) Slides.

(Continued)

*Primary Examiner*—Lien Tran
(74) *Attorney, Agent, or Firm*—Calfee, Halter & Griswold LLP

(57) ABSTRACT

Mixes, doughs and processes for commercial production of leavened high soy protein-containing bakery products which have from 2 to 7 grams of soy protein per serving. Leavened high soy protein-containing bread which has 6.5 grams of soy protein per serving. The mixes comprise separate wheat and gluten based and soy based premixes. The processes involve preparation of a gluten development mixture having long gluten strands and a hydrated soy mixture and the subsequent combination and resting of these mixtures in the preparation of doughs and breads and other bakery products.

8 Claims, No Drawings

OTHER PUBLICATIONS

Zhang et al., "The Effect of Bread-Making on Isoflavone Content and Composition in Soy Bread", The Ohio State University, Food Science & Technology Department (2003) Poster.

Zhang et al., "The Effect of In Vitro Soy Bread Digestion on Isoflavone Profile", The Ohio State University, Food Science & Technology Department and Department of Human Nutrition (Jul. 2002) Poster.

Zhang et al., "Effect of Soy on Bread's Physico-chemical Properties During Storage", The Ohio State University, Food Science & Technology Department, (Jul. 2002) Poster.

Zhang et al., "Isoflavone Profile and Biological Activity of Soy Bread", J. Agric. Food Chem. (2003) vol. 51, pp. 7611-7616.

Zhang et al., "Almond addition enriches isoflavone aglycones in soy bread", 2004 IFT Annual Meeting, Las Vegas, NV. (Jul. 12, 2004) Abstract.

Vodovotz, Y. Soy enriched bread, in: Technology of Functional Cereal Products, B. Hamaker (Ed.), Woodhead Puplishing Ltd., Cambridge, UK (2007).

Walsh, K.R. et al. "Stability and bioaccessibility from soy bread during in vitro digestion." Journal of Agricultural and Food Chemistry, (2003) 51(16) 4603-4609.

Zhang et al. "Proofing condition on the distribution of isoflavones in soy bread." 2004 IFT Annual Meeting, Las Vegas, NV, (Jul. 12, 2004) Abstract.

* cited by examiner

COMPOSITIONS AND PROCESSES FOR MAKING HIGH SOY PROTEIN-CONTAINING BAKERY PRODUCTS

This application is a divisional application of U.S. application No. 10/267,845, filed Oct. 9, 2002 now abandoned. The entire disclosure of application 10/267,845 is incorporated herein by reference.

BACKGROUND

The present invention relates to compositions and processes for making leavened high soy protein-containing bakery products which have good loaf volume, can be covered with suitable spreads without difficulty, have good crumb stability, and have organoleptic properties similar to traditional wheat-based, non-soy bakery product.

Soybeans have long been recognized for their health benefits based on epidemiological studies showing a decrease in the risk of several cancers (including breast, prostate and colon) and cardiovascular disease. These favorable health benefits may be attributed to isoflavones and a variety of other phytochemicals found in the beans and their products. Soybeans are also considered to be an excellent source of dietary protein, iron, vitamin-B, and calcium. Soy has also been shown to significantly decrease amylopectin recrystallization in bread products, thus it has beneficial effects on the shelf life of food items. Soy-based products are available in the form of raw and dried beans, soy flour, soy milk, soy oil and coagulated soy curd. Soy is also incorporated into many prepared products such as cheese, cereals, sauces, pasta, meat substitutes, and baked goods, including breads.

Due to growing consumer awareness of the health benefits of soy, there is a greater demand among consumers for soy-based products. Soy protein has been found to reduce the risk of heart disease when consumed as part of a diet low in saturated fat and cholesterol. In order to obtain the heart-healthy benefits of soy, the U.S. Food and Drug Administration recommends that an individual should eat at least 25 grams of soy protein daily. For a product to constitute an acceptable source of soy protein, a serving must provide about 6.25 g/serving of soy protein, as well as be low in fat, low in saturated fat, and low in cholesterol. In addition to reduced risk of heart disease, some research indicates that consumption of soy protein may also reduce the risk of osteoporosis and various forms of cancer (including breast, prostate and colon) and reduce the symptoms of menopause.

A number of consumer food products have been developed that incorporate soy, however, the typical bakery product contains soy in amounts that fall far below 6.25 g/serving. Such products cannot therefore use the FDA soy-based claim on the food packaging.

In addition to lacking a high soy protein content, many bakery products are also deemed unpalatable to many consumers even at relatively low soy protein amounts of 2 g per serving. It is well known that the addition of soy commonly imparts undesirable characteristics to bakery products. In particular, as compared with traditional wheat-based products, bread and other bakery products made with soy are typically of lesser volume, dark in color, very dense and chewy, and have a crumb texture that results in poor spreadability of spreads such as peanut butter. These products are also characterized by a beany and sometimes bitter taste. There is therefore a need for high-soy protein-containing bakery products that impart the "heart-healthy" benefits attributed to a high soy-protein content, and are also appealing to consumer tastes.

SUMMARY OF THE INVENTION

The present invention provides a mix for producing a bakery product that has a high soy protein content that meets the FDA claim for a "heart-healthy" product. More particularly, the present invention provides a mix for making a leavened, high soy protein-containing bread which has good loaf volume, can be covered with suitable spreads without difficulty or damage to the bakery product, has good crumb stability, has organoleptic properties similar to traditional wheat-based, non-soy bakery product, and is without a beany taste.

The present invention also provides a process for preparing bakery products containing high levels of soy protein with favorable texture and flavor properties. Soy protein-containing products, more particularly, soy protein containing bakery products that can be produced according to the present invention include, but are not limited to, bread, bagels, muffins, dinner, hot dog and burger rolls, cinnamon rolls, strudel and English muffins.

The present invention also provides a dough for preparing bakery products containing high levels of soy protein.

The present invention also provides a bread containing soy protein in the range of at least 2 to about 7 grams per 50 gram serving.

DETAILED DESCRIPTION OF THE INVENTION

Definitions

The term "baker's percentage" as used herein means the amount of each ingredient used expressed as a percentage of the amount of flour used.

The term "bakery product" means any bakery or baked product, good, item or snack item prepared for human consumption, such as, for example, bread, bagels, muffins, dinner, hot dog and burger rolls, cinnamon rolls, strudel and english muffins, or snack items.

The terms "blend", "blending" or "blended" means the mixing of dry, wet and/or both ingredients in a manner that creates a homogenous mixture where distribution of ingredients is the sole purpose. Energy input is kept to a minimum.

The term "dough conditioner" means a mix additive that comprises one or more of mono- and diglycerides, ascorbic acid and L-cysteine, preferably a combination of these agents. Optionally, certain other agents such as calcium stearoyl-2-lactylate and sodium stearoyl-2-lactylate may be provided as dough conditioning mix additives. Certain dough conditioners are well-known for use in yeast-leavened and other doughs and are believed to interact with the protein of bread doughs, forming cross linkages between protein platelets and their adjacent sheets. Generally, dough conditioners are also desirable for providing broad tolerance in dough mixing times, and for improving the hydration, handling and strengthening of dough.

The term "gluten" means essential wheat gluten isolate or other forms of gluten derived from sources such as wheat, oats, rye and barley.

The term "gluten development means the hydration and mixing process whereby wheat and added gluten combine with water and dough conditioner to create long strings of gluten.

The term "heart-healthy" means a descriptor of a product that qualifies under US federal regulations as a food that can bear packaging claims regarding heart-related health benefits. According to the 1999 U.S. Food and Drug Administration ruling permitting food manufacturers to include a health claim for soy as part of a healthy diet, bakery and other consumer products are "heart-healthy" if they qualify under the regulatory requirements to use health claims in labeling and advertising.

The term "inclusions" means ingredients that have essentially no functional effect on the chemistry of the dough-making process and are added for their textural, bulk fiber, flavor or nutritional properties. Inclusions include but are not limited to raisins, brans (e.g., oat bran, soy bran, wheat bran, or other brans), nuts, dried or fresh fruits or berries, butter, margarine, spices and seasonings, dried and fresh cheeses.

The term "leavening agent" means agents which are known to cause bakery products to expand with air or rise during the proofing or baking processes. Common leavening agents include active yeast, active dry yeast, baking soda and baking powder or any combination of base and acid? or microorganism that produce carbon dioxide gas.

The term "loaf volume" means the physical property of a loaf of bakery product such as bread, roll, or muffin. Loaf volume is calculated as the ratio of the initial weight of the dough unit to the finished weight of the bakery product. Visually, the term loaf volume refers to the apparent loft, or height of a bakery product.

The term "mix", "mixing" or "kneading" means mechanical manipulation to provide a homogenous mixture, employing relatively high energy input as compared to blending, resulting in changes to the physical properties of the dough and is often but not always associated with an increase in temperature of the mix ingredients.

The term "organoleptic" as used herein means being, affecting, or relating to oral sensory organ qualities including taste and mouth feel of a bakery product.

The term "oven spring" means the last, quick rise a bakery product such as bread goes through when a leavened or risen dough is first placed in a hot oven.

The term "proofing" means the process that is repeated one or more times whereby dough is allowed to rise under controlled climatic conditions where the temperature and the humidity are maintained at desired levels. Proofing in the case where yeast is used as the leavening agent means the process where the yeast ferments some of the sugars or other available food sources in the dough, forming carbon dioxide and thereby causing the bread to expand and increase in size. Rapid proofing means a single proofing step. Slow proofing means a multi-step process whereby the dough is proofed at least twice, and wherein the dough is beaten or punched to deflated prior to the second proofing step.

The term "proofing yeast" means to dissolve yeast in warm liquid such as water with a carbohydrate such as sugar for a period of time sufficient to permit the development of foam on top, usually about 5 minutes. A yeast proofing premixture comprises yeast, warm water and food source mixed for about 5 minutes.

The term "soy flour" means refers to the protein-containing ingredient that remains after the oil is extracted from soybeans. Typically about 50 percent protein, soy flour is the natural product with the highest content of isoflavones, identified by many scientists as one of the natural components in soy responsible for the health benefits. Oil content of soy flour ranges from less than one percent for defatted soy flour to approximately 6 percent for low fat soy flour, up to about 18 to about 20 percent for full fat soy flour.

The term "soy hydration" means the process whereby a combination comprising soy flour and water is blended and permitted to rest undisturbed for a period of time sufficient to permit the soy flour to become wetted by and absorb the hydrating liquid.

The term "soy milk" means a soy food obtained as a result of combining: (1) aqueous-extracted whole soybean solids and water; or, (2) other edible-quality soy protein solids, soybean oil, and water soy milk may be provided in either a liquid concentrated liquid or a dry powdered form.

The term "sweetening agent" as used herein refers to carbohydrate and non-carbohydrate, nutritive and non-nutritive sweetening agent The tern "wheat flour" as used herein refers to flour derived from wheat grain The term "yeast" as used herein refers to active or inactive dry yeast.

Superior Soy Protein-containing Products

The instant invention provides a mix and process that provides a superior soy protein-containing product, more particularly bakery product, and more particularly a leavened bread, that has a soy protein content in the range of at least 2 grams per serving. Preferably the soy protein content is from 2 to 7 grams per 50 gram serving. More preferably the soy protein content is about 5 grams per serving. Most preferably the soy protein content is about 6.5 grams per serving. The most preferable high protein form of the bread made according to this invention provides bread slices that have a pleasant texture, comparable to more traditional wheat-based breads such as those containing eggs, for example, Challah bread. Each serving of 50 g, which may comprise, for example, either a large slice or two small slices of bread, has a light, moist, slightly chewy texture with a pleasing mildly-sweet taste. Each serving also delivers greater than the amount of soy protein deemed acceptable by the United States Food and Drug Administration to assert packaging claims of heart health benefits. Other forms of bakery products can also be made according to the present invention with soy protein content in the range of 2 grams to about 7 grams per serving.

Soy Mixes for Bakery Products

In one embodiment, the present invention provides a mix for the production of soy-based bakery products. Preferably, the mixes of the present invention comprise a first premixture which comprises wheat flour, dough conditioner, gluten and optionally, leavening agent, and a second premixture which comprises soy flour and dry soy milk, and optionally, sweetening agent.

Less preferably, the mixes of the present invention comprise a first premixture which comprises wheat flour, dough conditioner, gluten and optionally, leavening agent, and a second premixture which comprises soy flour or other soy protein sources, and optionally, sweetening agent, but which lacks dry soy milk.

In another embodiment, the present invention provides a mix for the production of soy-based products which mix comprises two dry ingredient premixtures and a yeast premixture. The first dry ingredient premixture comprises wheat flour, dough conditioner, and gluten. The second dry ingredient premixture comprises soy flour, dry soy milk and sweetening agent. The third premixture is active yeast or a yeast proofing premixture comprising dry yeast, and sucrose.

The mixes of this invention include both a greater amount of gluten and a greater amount of soy protein than the amount of gluten and soy protein found in other soy protein-containing mixes. The inclusion of additional gluten in combination with a high amount of soy protein contributes to the production of a loaf with greater volume as compared to other soy protein-containing products, particularly breads.

The preferred wheat flour in the mixes of this invention is a high-gluten bread flour, most preferably a strong, or high protein containing, high-gluten bread flour. Other wheat flours that may be used include high gluten (high protein) all purpose flour or cake flour, soy flour may be used in either its full fat reduced fat, or defatted forms. Preferably, reduced fat soy flour is used in the mixes of the present invention.

The mixes of the present invention preferably comprise soy milk. The use of soy milk in combination with wheat and soy flour has a highly desirable and unexpected effect on the overall quality of the resulting product, particularly bread. Mixes lacking soy milk provide a high quality bakery product with improved loaf volume, crumb texture and taste as compared to other soy-based bakery products when used according to the processes disclosed herein, however, inclusion of soy milk, preferably dry soy milk, in the mixes of the present invention, provide products that are significantly improved. Dry powdered soy milk is preferably included in premixture two. Soy milk may alternatively be provided in its concentrated liquid form and is not included in either of the dry ingredient premixtures.

Preferably, the leavening agent in the mixes of this invention is active yeast, usually present in an amount of about 0.5 percent to about 10 percent by weight, based on the weight of the mixture. As an alternative to active yeast, dry yeast may also be used in an amount of about 0.5 percent to about 10 percent by weight, based on the weight of the mix and is preferably provided in the form of a yeast proofing mixture. In the case where dry yeast is used, the yeast must first be proofed or activated prior to addition to the first premixture. Most preferably, active yeast is used to produce the soy protein-containing products of the present invention. Less preferred leavening agents include baking powder and baking soda and other microorganisms that produce carbon dioxide gas.

The mixes of the present invention also comprise a dough conditioner. The dough conditioner is selected from agents that provide lubrication to the dough, such as mono-and diglycerides, agents that serve as food source for yeast, such as ascorbic acid, and agents that serve to create chemical linkages between the gluten and soy components, such as L-cysteine or trans-glutaminase. Generally, any suitable commercial dough conditioner can be used and most preferably a dough conditioner which comprises mono- and diglycerides, ascorbic acid and L-cysteine will be used. The dough conditioner should be present at a level of from about 0.9 percent to about 3 percent based on the weight of the mix.

The mixes of the present invention will preferably comprise a sweetening agent. In addition to providing flavor enhancement, sweetening agent is useful where yeast is used as the leavening agent so that the yeast can more easily utilize the carbohydrates, which results in faster gas production as compared to other yeast food sources. The preferred sweetening agent for the mixes of the present invention is sucrose. Alternative sweeteners such as fructose, high-fructose corn syrup, honey and fruit juice may also be used. Sweetening agent is present in the mix at about 1 percent to about 15 percent by weight, based on the weight of the mix.

Optionally, preservative agents such as calcium propionate or parabenes may be added to the mixes of the present invention, either in premixture one or premixture two. The amounts of such preservatives are determined based on the agent selected and are in the range of about 0.1 percent to about 1 percent by weight, based on the weight of the mix.

Optionally, other ingredients may be included in the mixes of the present invention in the form of salt, flavorants, seasonings and inclusions, and may be added either to premixture one or, more preferably to premixture two. These ingredients will generally not have any functional role in the chemistry of the product of the mixes, and as such, may be added at any point during the preparation process, and may be included in either the first or the second dry ingredient premixture.

Process for Making Bakery Products

In another embodiment, the present invention provides a process for the production of soy-based products, particularly bakery products, and more particularly, bread. The process for preparing the dough for such soy-based products comprises the following steps:

(a) providing a first premixture of dry ingredients comprising wheat flour, gluten, and dough conditioner;
(b) providing a second premixture of dry ingredients comprising soy flour, dry soy milk, and sweetening agent;
(c) providing a third premixture comprising leavening agent selected from the group consisting of active yeast, a yeast proofing mixture, and other non-yeast based leavening agents;
(d) providing water at a temperature customary to operating temperatures of a bakery such that the dough temperature does not exceed 83° F., and more preferably, does not exceed 80° F.
(e) providing shortening;
(f) combining said first premixture in the mixing bowl together with said third premixture and a predetermined portion of said water and mixing said combination for a sufficient time to provide a gluten development mixture characterized by production of long gluten strands;
(g) combining said second premixture with the remainder of said water and blending said combination for a sufficient time to achieve wetting of the dry ingredients of said second premixture with the water and produce a hydrated soy mixture;
(h) combining and blending the gluten development mixture of step (f) with said second premixture of step (g);
(i) allowing the combination of step (h) to rest for a period of about 5 minutes;
(j) mixing the rested combination of step (i) for a period of about 4 minutes;
(k) adding the shortening to the mix of step (j) and mixing for an additional period of one minute or an amount of time sufficient to produce a dough that forms course sheets.

Step (g) is achieved separate from the gluten development mixture of step (f). As a variation in step (g), said second premixture may be placed on the top of the gluten development mixture where it is combined with the water and blended with said gluten development mixture to produce a hydrated soy and gluten development mixture.

Disclosed here as an aspect of this invention is the unexpected discovery that the sequence of combining the premixtures strongly influences the quality of the final baked product. Standard baking techniques do not recognize any importance to the sequence of hydration and order of combination of discrete dry ingredients in a flour mixture. In fact, wheat, soy and other breads known in the art of bread baking, particularly commercial bread baking, typically call for providing or combining all dry ingredients in a single mix, then adding water or other non-dry ingredients except shortening to achieve hydration. Through the present invention it was discovered that mixing the wheat and gluten premixture in the absence of the soy protein ingredients allows optimal creation of long gluten strands. These long gluten strands are from about 1 to about 7 inches in length and resemble the gluten strands observed in traditional wheat doughs, which range from about 7 inches to greater than 7 inches in length. In contrast, the gluten strands that are observed in soy protein-containing doughs made by mixes and processes other than those disclosed herein are typically less than one inch in length.

Blending the soy protein premixture with water, either alone or together with the gluten development mixture, provides optimal conditions for achieving a hydrated soy mixture that interacts with the long gluten strands to produce a highly desirable product with a greater loaf volume, and favorable texture and density. In contrast, soy protein-containing products made the conventional way, that is whereby the dry wheat, gluten and soy components are combined as a single mix and then mixed with water, form less than optimal gluten strands and provide a more dense and flat baked product.

During the dough preparation steps, the temperature of the mixture is maintained at less than 83° F. to avoid a final product that is less than optimal. Preferably the temperature of the mixture is maintained in the range of about 70° F. to about 82° F., and most preferably the temperature is maintained at about 80° F. To maintain the desired dough preparation temperature, coolants such as small amounts of cold water, ice, or dry ice or any other form of heat transfer that removes heat from the mix can be added directly to the mixture. Alternatively, the mixture can be moved to a cold room or coolant may be applied externally to the bowl.

Yet another aspect of this invention that constitutes an advancement over the art is the introduction of the resting step (i), after the blending of the soy-based second premixture with water and the gluten development mixture (g). It is believed that the resting step allows the soy protein to hydrate to an extent sufficient to permit optimal interaction with the wheat gluten strands, thus resulting in a dough with a tender and lighter texture as compared with other more dense and coarse soy-based bakery products. Elimination of this resting step from the dough making process disclosed herein results in a bakery product that has less than optimal physical properties, and more closely resembles the flat, more dense and chewy soy containing products known in the art. Preferably, the second premixture is hydrated in the same bowl as the gluten development mixture. Optionally, the second premixture may be hydrated in a separate bowl and thereafter blended with the gluten development mixture either just before the resting step (h) or just before the mixing step (j).

Shortening is added during the last mixing phase, and may be added any time from the beginning of that phase until the last minute. Preferably, the shortening is added during the last minute of the last mixing step (j).

Upon completion of steps (a) through (k), the resulting dough may be further processed to produce a baked good, or it may be packaged as desired for freezing or other form of storage. Further processing the dough to produce soy-containing products comprises the following steps:

(a') allowing the dough to rest at ambient room temperature and humidity for about 15 minutes;

(b') scaling the dough by separating into units of desired weight;

(c') shaping and forming the dough units into desired shapes and placing said dough units in individual baking pans or other utensils;

(d') proofing the dough units at about 120° F. and about 70 percent to 80 percent relative humidity for about 50 minutes or an amount to time sufficient to permit the dough units to double in volume;

(e') baking the individual dough units at a predetermined oven temperature for about 50 to about 60 minutes or an amount of time sufficient to provide baked units with predetermined internal temperature and the desired degree of external surface browning;

(f') allowing the baked units to rest for about 50 to 60 minutes;

(g') utilizing or packaging the individual baked units as desired.

If the dough is to be further processed to produce a desired product, it may first be rested for about 15 minutes according to step (a'), or optionally, the resting step may be eliminated and the dough may be immediately scaled, shaped and panned as desired then proofed.

It is desirable to proof the dough at a temperature of about 105° F. to about 135° F. Preferably the proof temperature will be about 120° F. During the proofing process, it is desirable to maintain the relative humidity at greater than 50 percent and less not greater than 85 percent. Preferably the relative humidity will be about 70 percent to 80 percent and most preferably the humidity during proofing will be 80 percent. Optionally, the dough may be either rapid or slow proofed. In contrast to other soy-protein containing doughs which contain as little as 2 g of soy protein per serving, the dough prepared according to the instant invention is loftier and expands to twice its initial volume by the end of the proofing process and is comparable to doughs made from traditional wheat-based mixes.

It is desirable to bake the dough units at a temperature of about 325° F. to 375° F. Preferably the temperature will not exceed 349.9° F., so as to avoid the effect of Malliard browning which causes a chemical reaction between protein and carbohydrate components of the bread to produce a darkened ("browned") appearance. Most preferably, the oven temperature will be about 345° F. Optionally, the oven temperature may be increased for an amount of time necessary to achieve a desired level of browning. Notably, products made according the instant invention exhibit greater oven spring as compared with other soy-containing products. The greatest amount of oven spring is observed in the smaller bakery products such as rolls, buns and muffins.

EXAMPLE 1

Soy bread according to the invention was prepared from the following ingredients:

| Ingredients | Grams | Percent based on Weight of Mix | Bakers Percentage (Percent based on Weight of Flour) |
|---|---|---|---|
| Dry Yeast (e.g. Red Star Instant Active Dry Yeast) | 12.8 | 0.94 | 2.57 |
| Water | 633 | 46.50 | 127.29 |
| Wheat flour | 232.5 | 17.08 | 46.75 |
| Wheat gluten isolate | 30 | 2.20 | 6.03 |
| Dough conditioner (e.g. Caravan Products Company) | 2.5 | 0.18 | 0.50 |
| Soy milk powder | 88.4 | 6.49 | 17.78 |
| Soy flour (reduced fat) | 264.8 | 19.45 | 53.25 |
| Sucrose | 60 | 4.41 | 12.06 |
| Salt (NaCl) | 12.2 | 0.90 | 2.45 |
| Shortening (e.g. Crisco all vegetable) | 23.1 | 1.70 | 4.64 |
| Calcium propionate | 2 | 0.15 | 0.40 |
| TOTAL | 1361.3 | 100 | 2.57 |

The ingredients were manufactured by or obtained from the following sources: the wheat flour was manufactured by General Mills Operations, Inc., Minneapolis, Minn.; the gluten was wheat gluten with vitamin C and was manufactured by Hodgson Mill, Inc., Teutopolis, Ill.; the dry yeast, Red Star Instant Active Dry Yeast, was manufactured by Universal Foods Corporation, Milwaukee, Wis.; the sucrose was manufactured by The Kroger Co., Cincinnati, Ohio; the salt was manufactured by The Kroger Co.; the reduced-fat soy flour was manufactured by ADM Protein Specialties Division, Decatur, Ill.; the soy milk powder was manufactured by Devansoy Farms, Carroll, Iowa; the shortening was manufactured by Procter & Gamble, Cincinnati, Ohio; and the propionate was.

The following premixtures of dry ingredient were provided. Premixture one, the "gluten development mixture," included wheat flour, wheat gluten isolate, and dough conditioner. Premixture two, the "soy mixture," included soy milk powder, soy flour, salt, and sucrose (less the amount of sucrose used for yeast activation).

The dry yeast, which was provided separately from the other dry ingredients, was placed in the bottom of a mixing bowl and 4 g of the sucrose and 61 g of the water were added to activate the yeast. The yeast was allowed to activate for 3 minutes. Premixture one was then placed in the mixing bowl on top of the activated yeast. Water, 255 g, was added to the bowl and the entire contents was mixed for 5 minutes in a Kitchen Aid KA5 at high speed (setting 6) until long gluten strings were achieved. The temperature of the mixture was continuously monitored and small amounts of ice were added as needed to ensure that the temperature of the dough mixture did not exceed 80° F.

Premixture two was then placed in the mixing bowl on top of the gluten development mixture. Water, 315 g, was added and the entire contents of the bowl was blended on low speed (setting between 1 and 3 on a scale of 10) for two minutes, just until the dry ingredients were incorporated with the water. The entire mixture was then allowed to rest for 5 minutes to permit hydration of the soy ingredients.

After the rest period, the dough was mixed at high speed for a total of 5 minutes. After 4 minutes of mixing, the shortening was added to the mixing bowl for incorporation into the mixture. Mixing was completed after 5 minutes, when the mixture formed course sheets.

The dough was removed from the mixing bowl and placed on a floured surface to rest for 15 minutes. The dough was then scaled by separating into units of approximately 1 pound 1 ounce using a dough cutter. Individual portions of dough were shaped and formed into the desired loaf shape and placed in individual baking pans. The formed and panned loaves were proofed at 123° F. and ~80 percent relative humidity for 50 minutes until the dough doubled in volume.

Individual loaves were baked in a 345° F. oven for approximately 50 to 60 minutes until the internal loaf temperature was 200° F. and the surface of the loaves remained relatively free from browning. The loaves were rested for 50 to 60 minutes prior to packaging.

The resultant loaves showed good loaf volume, had an overall good mouth feel with a pleasing crumb texture, a somewhat chewy consistency, and a mildly sweet, non-beany taste.

The invention claimed is:

1. A process for commercial preparation of high soy protein-containing bakery product with organoleptic properties similar to traditional wheat-based, non-soy bakery product, which comprises the steps of:
    (a) providing a first premixture comprising wheat flour, about 14 to about 60 percent by weight, based on the weight of the mix, gluten, about 1 to about 10 percent by weight, based on the weight of the mix, leavening agent, about 0.5 to about 10 percent by weight, and dough conditioner, about 0.9 to about 2 percent by weight, based on the weight of the mix;
    (b) providing a second premixture comprising soy flour, about 10 to about 30 percent by weight, and dry soy milk, about 5 to about 9 percent by weight;
    (c) combining said first premixture with water and mixing said combination for a sufficient time to provide a gluten development mixture having long gluten strands;
    (d) combining said second premixture with water to provide a hydrated soy mixture and blending said combination together with said gluten development mixture;
    (e) allowing the combination of step (d) to rest for a period of at least 5 minutes;
    (f) mixing the rested combination of step (e) for a period from about one minute to about 5 minutes;
    (g) providing shortening about 0.5 to about 4 percent by weight, based on the weight of the mix;
    (h) adding the shortening to the mix of step (f) and mixing for a period of time sufficient to produce a dough that forms course sheets, wherein the combined mixing time of step
    (f) and this step (h) does not exceed a total of about 5 minutes;
    (i) forming the dough into units for baking;
    (j) proofing the dough units; and
    (k) baking the proofed dough units.

2. The process as claimed in claim 1 wherein the dough of step (h) is rested for a period of from about 3 to about 15 minutes before the forming step (i).

3. The process as claimed in claim 1 wherein the ambient temperature during proofing is within the range of from about 80° to about 120° F. and the relative humidity is within the range from about 0 to about 80 percent.

4. The process as claimed in claim 1 wherein the second premixture also comprises about 0.1 percent to about 0.9 percent by weight, based on the weight of the mix, of sodium chloride and about 1 to about 10 percent by weight, based on the weight of the mix, of sucrose.

5. A process for preparing a soy protein-containing bakery product, the process comprising:
    (a) combining a first premixture comprising wheat flour, gluten, and dough conditioner, with water;
    (b) mixing the combination of water and the first premixture to form a hydrated gluten-containing dough;
    (c) combining the hydrated gluten-containing dough with a second premixture comprising soy protein;
    (d) mixing the hydrated gluten-containing dough with the second premixture to form a soy protein-containing dough; and
    (e) allowing the soy protein-containing dough of step (d) to rest for a period of at least 5 minutes.

6. The process of claim 5, further comprising a step (f) mixing the rested combination of step (e) for a period from about one minute to about 5 minutes.

7. The process of claim 6, further comprising a step (g) adding shortening to the soy protein-containing dough after the mixing step (f).

8. The process of claim 6, further comprising the steps:
    (g) adding shortening to the soy protein-containing dough after the mixing step (f); and (h) mixing for a period of time sufficient to produce a dough that forms course sheets, wherein the combined mixing time of step (f) and this step (h) does not exceed a total of about 5 minutes.

* * * * *

UNITED STATES PATENT AND TRADEMARK OFFICE
CERTIFICATE OF CORRECTION

PATENT NO. : 7,592,028 B2  Page 1 of 1
APPLICATION NO. : 11/210303
DATED : September 22, 2009
INVENTOR(S) : Vodovotz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 990 days.

Signed and Sealed this

Twenty-first Day of September, 2010

David J. Kappos
*Director of the United States Patent and Trademark Office*